United States Patent [19]
Suda

[11] Patent Number: 5,511,169
[45] Date of Patent: Apr. 23, 1996

[54] DATA TRANSMISSION APPARATUS AND A COMMUNICATION PATH MANAGEMENT METHOD THEREFOR

[75] Inventor: Eiichi Suda, Aichi, Japan

[73] Assignee: Mitsubishi Denki Kabushiki Kaisha, Tokyo, Japan

[21] Appl. No.: 8,748

[22] Filed: Jan. 25, 1993

[30] Foreign Application Priority Data

Mar. 2, 1992 [JP] Japan .................................. 4-044734

[51] Int. Cl.$^6$ ................................................. G06F 13/00
[52] U.S. Cl. ........................................ 395/280; 395/858
[58] Field of Search .............................. 395/325, 650, 395/200, 275, 858, 280, 650

[56] References Cited

U.S. PATENT DOCUMENTS

| | | |
|---|---|---|
| 4,191,941 | 3/1980 | Springer et al. . |
| 4,207,609 | 6/1980 | Luiz et al. ................ 395/325 |
| 4,396,984 | 8/1983 | Videki, II ................ 395/275 |
| 4,455,605 | 6/1984 | Cormier et al. ........... 395/275 |
| 4,471,457 | 9/1984 | Videki, II ................ 395/275 |

FOREIGN PATENT DOCUMENTS

| | | |
|---|---|---|
| 0462542 | 3/1980 | European Pat. Off. . |
| 61-49540 | 3/1986 | Japan . |
| 64-5243 | 1/1989 | Japan . |
| WO/8601361 | 2/1986 | WIPO . |

OTHER PUBLICATIONS

H.M. Deitel, "An Introduction To Operating Systems", Feb. 24, 1984, Addison–Wesley, Reading, U.S., Paragraph 9.3.

*Primary Examiner*—Glenn A. Auve
*Attorney, Agent, or Firm*—Sughrue, Mion, Zinn, Macpeak, & Seas; Richard C. Turner

[57] ABSTRACT

A data transmission apparatus and a communication management method for transmitting data from task program devices to peripheral devices over a plurality of communication paths. The apparatus includes a communication path management table for storing management data corresponding to each communication path established between the task program devices and the peripheral devices, a communication path management device for retrieving the management data from the communication path management table to select a communication path in response to a request from a requesting task program device to establish a communication path to a specified peripheral device, and a communication protocol processor for controlling communications between the task program devices and peripheral devices by establishing the selected communication path between the requesting task program device and the specified peripheral device.

19 Claims, 5 Drawing Sheets

DATA TRANSMISSION APPARATUS AND A COMMUNICATION PATH MANAGEMENT METHOD THEREFOR

BACKGROUND OF THE INVENTION

The present invention relates, in general, to a local area network including a data transmission apparatus and a communication path management method therefor. More particularly, the present invention relates to an apparatus for and a method of generating communication protocol for establishing a communication path between a main system and a plurality of peripheral devices. The present invention has particular applicability in an Open Systems Interconnection (OSI) communication protocol system.

In conventional communication networks, the transfer of data from one location to another over a communication path occurs in one of two manners. The first manner requires that a communication path be established as data is about to be transferred and the second manner requires no communication path to be established. A conventional communication control mode for a communication network system of the former data transmission type is disclosed in Japanese Patent Publication No. 49540/1986. This system will be described with reference to FIGS. 6 to 8.

Figure 6:
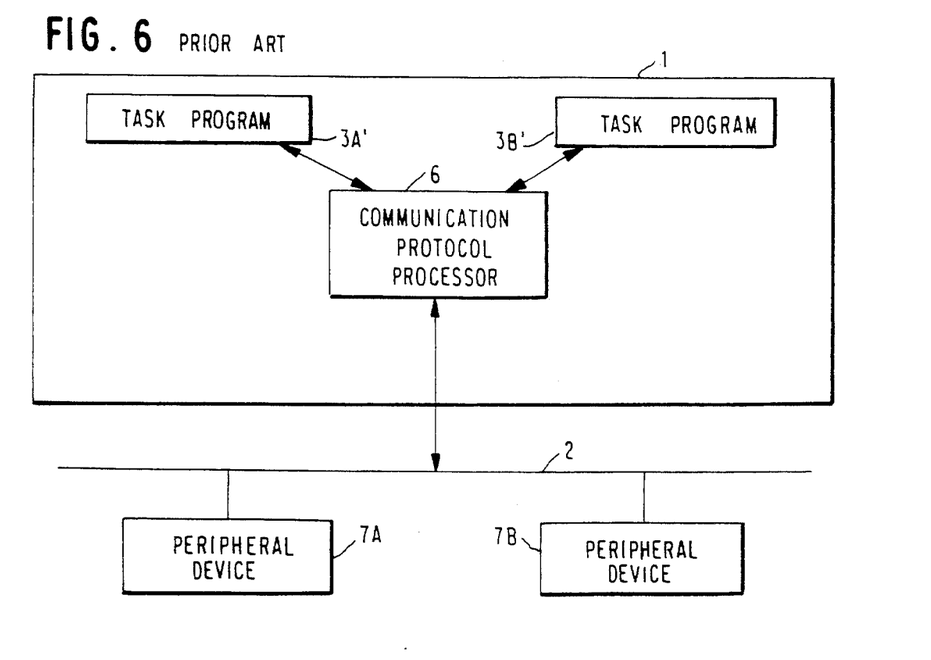
FIG. 6 is a block diagram of a conventional data transmission apparatus.

FIG. 6 illustrates a block diagram of a conventional communication network system including a data transmission apparatus 1, a communication network 2 connected to the data transmission apparatus 1, task program devices 3a, 3b which exist as or execute task programs in the data transmission apparatus 1, and a communication protocol processor 6 coupled to the task program devices 3a and 3b and the communication network 2 for processing the communication protocol of the network 2. Peripheral devices or systems 7a, 7b (which may be either hardware or software) are coupled to the other end of the communication network 2 for communicating with the data transmission apparatus 1. In this specification, the terms "task program" and "task program device" are interchangeable and are defined simply as sources of data communications. For example, the task program devices may simply be software or may be hardware units capable of executing software.

The network 2 is physically connected to the data transmission apparatus 1 and the peripheral devices 7a, 7b by, for example, a pair of cables or a single optical cable. Software initializes the communication path which links the data transmission apparatus 1 and the peripheral devices 7a, 7b via the network 2. The transmission of data between the data transmission apparatus 1 and the peripheral devices 7a, 7b is made after establishing a communication path with one of the corresponding peripheral devices 7a, 7b. The communication path is established by a CPU (not shown) in the data transmission apparatus 1 which executes a task program 3a, 3b provided for use with one or more of the corresponding peripheral devices.

Figure 7:
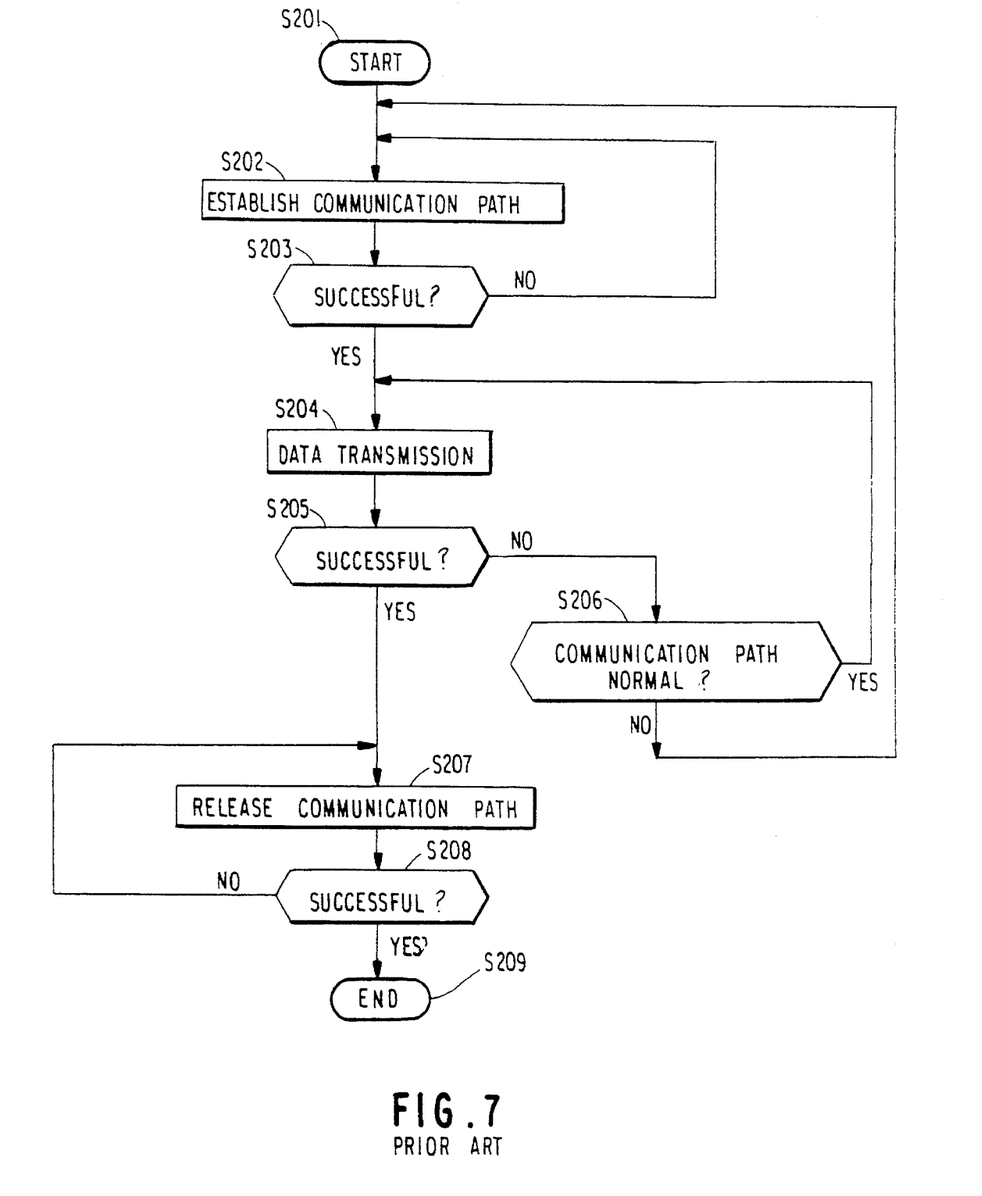
FIG. 7 is a flow chart illustrating a data transmission sequence by a task program in the data transmission apparatus of FIG. 6.

FIG. 7 illustrates a flow chart describing a data transmission sequence.

The execution of a task program begins with step S201 and a communication path establishment request is output to the communication protocol processor 6 in step S202. After receiving the communication path establishment notice, it is determined whether the communication path has been established (step S203). If the communication path has been established, execution proceeds to step S204, otherwise, execution returns to the step S202.

In step S204, the task program device issues a data transmission request to the communication protocol processor 6 and waits until a data transmission end notice is received from the communication protocol processor 6. In step S205, the data transmission end notice is checked to determine the status of the data transmission. If the data transmission is successful, execution advances to step S207. However, if it has failed, execution proceeds to step S206 where if the state of the communication path is normal, execution returns back to step S204 and if a fault is detected execution returns back to step S202.

In step S207, a communication path release request is output to the communication protocol processor 6 and the result of this request is checked in step S208. If it has succeeded, execution progresses to step S209, where the processing is terminated. On the other hand, if it has failed, execution returns to the step S207.

Figure 8A:
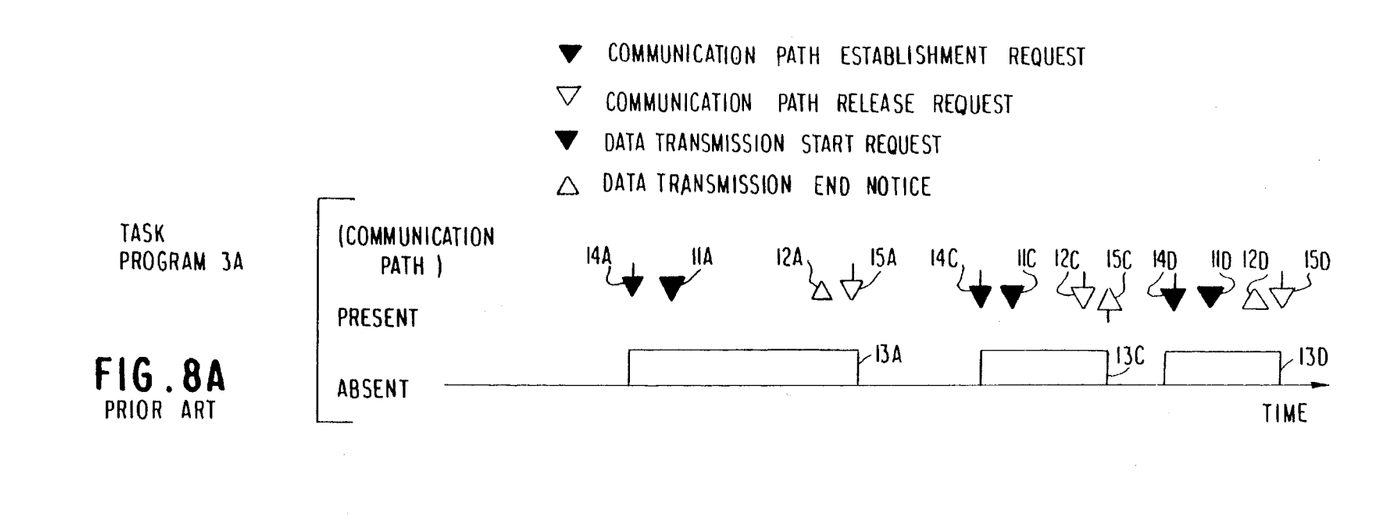
FIGS. 8A and 8B illustrate a timing chart depicting how the task program establishes/releases a communication path in the data transmission apparatus of FIG. 6.
Figure 8B:
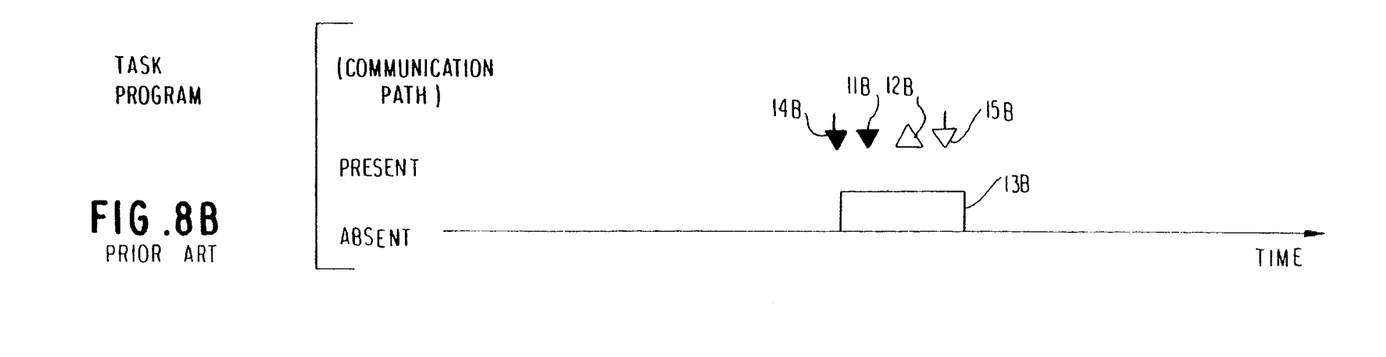

FIGS. 8A and 8B show a timing chart illustrating the task program devices 3a, 3b sharing a single communication path for transmitting data. Reference numerals 11a to 11d indicate data transmission start requests output from the task program devices 3a, 3b to the communication protocol processor 6, numerals 12a to 12d represent data transmission end notices output from the communication protocol processor 6 to the task program devices 3a, 3b, numerals 13a to 13d designate communication path holding periods, numerals 14a to 14d designate communication path establishment requests output from the task program devices 3a, 3b to the communication protocol processor 6, and numerals 15a to 15d represent communication path release requests output from the task program devices 3a, 3b to the communication protocol processor 6.

In the timing charts of FIGS. 8A and 8B, the task program device 3a first outputs the communication path establishment request 14a to the communication protocol processor 6 to establish a communication path followed by the data transmission request 11a to the communication protocol processor 6 to transmit data to the other end device (not shown). The task program device 3a waits for the data transmission end notice 12a from the communication protocol processor 6, and upon receiving this data transmission end notice 12a, the communication path release request 15a is output to release the communication path, which completes the data transmission operation.

Hereafter, FIGS. 8A and 8B show how data is transmitted in a similar manner first by the task program device 3b and then by task program device 3a.

The conventional data transmission apparatus arranged as described above establishes a communication path prior to transmitting data and then releases the communication path at the end of each communication. For numerous reasons, such as restrictions on the available resources (e.g., internal memory), the data transmission apparatus generally has a limited number of communication paths which can be established at one time. Hence, each task program device must often establish and release its communication path, which complicates the task programs.

In addition, when a communication path is interrupted due to a fault (e.g., noise on the network), during a data transmission period, the path must be reestablished. In this event, the task program devices must always obtain the state of the communication path which further complicates the task programs.

The known Manufacturing Automation Protocol (MAP) System, which is sometimes employed in an OSI communication system is generally classified into two types: "full- MAP," which conforms to an OSI seven layer model, and "mini-MAP," which does not have the third to sixth layers in the OSI seven layer model. Task programs designed for these applications are different in that while the full-MAP application always requires a communication path to be established/released, mini-MAP includes a few communication systems which do not require a communication path to be established/released. In this communication system the communication path does not need to be established/released and data is sent to a peripheral device with the destination indicated by the task program in every communication. To utilize a task program designed for a mini-MAP system having a known data transmission apparatus in full-MAP, communication path establishment/release processing must be added and the communication path cannot be shared without this processing.

SUMMARY OF THE INVENTION

Accordingly, it is a general object of the present invention to provide a data transmission apparatus and a communication path management method therefor which have automated the management of communication paths so that task programs can be designed without having to be concerned about whether a communication path is already established, and which is free of the above-mentioned problems and disadvantages.

It is also an object of the present invention to provide a data transmission system and a communication path management method therefor in which the communication path can be assigned regularly (defaulted) to an application with high priority thereby minimizing overhead due to the establishment/release of the communication path.

It is another object of the present invention to provide a data transmission system and a communication path management method therefor in which if a communication path is requested by a task program and a communication path shortage occurs, a communication path used less often or with low probability of use is released thereby minimizing overhead due to the establishment/release of the communication path.

In accordance with the above and other objects, the present invention provides a data transmission apparatus for transmitting data from task program devices to peripheral devices over a plurality of communication paths, including a communication path management table for storing management data corresponding to each communication path established between the task program devices and the peripheral devices, a communication path management device for retrieving the management data from the communication path management table to select a communication path in response to a request from a requesting task program device to establish a communication path to a specified peripheral device, and a communication protocol processor, responsive to an output of the communication path management device, for controlling communications between the task program devices and peripheral devices by establishing the selected communication path between the requesting task program device and the specified peripheral device.

Further in accordance with the above objects, the present invention provides a communication path management method for a data transmission apparatus for transmitting data from task program devices to peripheral devices over a plurality of communication paths, which includes the steps of requesting a communication path to a specified peripheral device for transmitting data, retrieving management data stored in a communication path management table and determining based on the management data whether a communication path to the specified peripheral device is already available, and establishing a communication path to the specified peripheral device if a communication path to the specified peripheral device is not already established.

The above and other objects, features, and advantages of the present invention will become more apparent from the following detailed description taken in conjunction with the accompanying drawings.

DETAILED DESCRIPTION OF THE PREFERRED EMBODIMENTS

Figure 1:
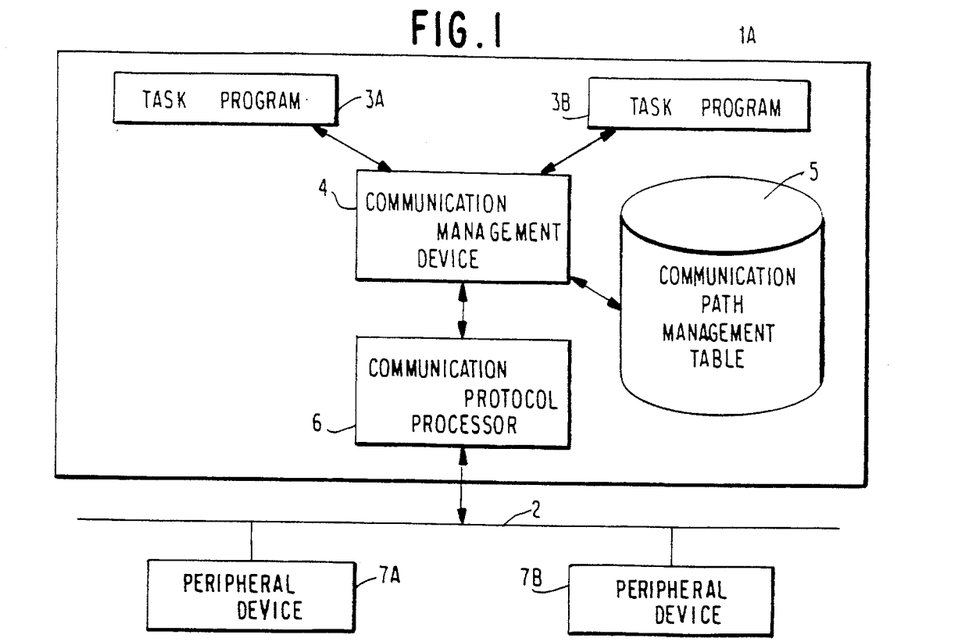
FIG. 1 is a block diagram of a data transmission apparatus in accordance with a preferred embodiment of the present invention.

FIG. 1 shows a block diagram of a programmable data transmission apparatus 1A, which includes task program devices 3a, 3b, a communication management device 4 for managing the communication path or paths used by task program devices 3a, 3b, a communication path management table 5 for storing information necessary for the communication path management device 4 to manage the communication path, and a communication protocol processor 6.

Figure 2:
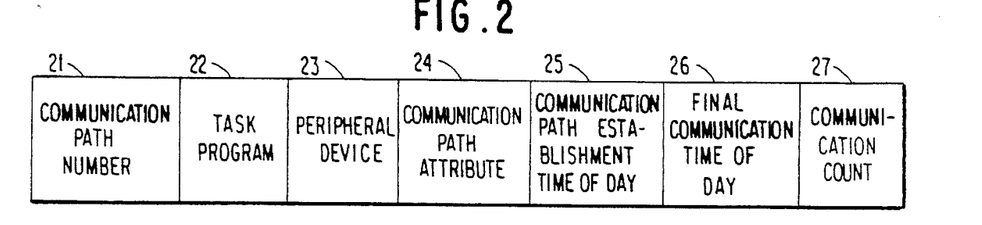
FIG. 2 illustrates a record structure of a communication path management table in the data transmission apparatus of FIG. 1.

FIG. 2 shows the record structure of the communication path management table 5, which includes a recording area for a communication path number 21, a task program label 22, a peripheral device label 23, a communication path attribute 24, a communication path establishment time 25, a last communication time 26, and a communication count 27. The communication path management table 5 has a plurality of records, each record composed of the above recording areas, corresponding to a plurality of communication paths that the data transmission apparatus 1A can support.

The operation of the communication management device 4 upon receiving a data transmission request from one of the task program devices 3a, 3b will now be described in accordance with the flow chart of FIG. 3.

In step S101, the communication path management device 4 initiates a data transmission operation. In step S102, a communication path establishment request from one of the task program devices 3a, 3b, is sent to the communication path management device 4, which then retrieves management data from task program label recording area 22 and the peripheral device label recording area 23 in the communication path management table 5.

In step S103, the communication path management device 4 then determines whether a communication path has been established between the specified peripheral device and the requesting task program device. If it is determined that the communication path to the specified peripheral device has been established, then execution advances to step S115. If the communication path has not been established, then execution proceeds to step S104, where the management data in the communication path number recording area 21 of the communication path management table 5 is retrieved to check for a vacant communication path. In step S105, it is checked whether a vacant communication path currently exists in the data transmission apparatus 1A so that if a vacant path exists execution proceeds to step S113, otherwise execution continues on to step S106.

If a vacant communication path does not exist then the management data in the communication path attribute recording area 24 of the communication path management table 5 is retrieved to determine which one of a plurality of communication paths can be released and then established for the requesting task program device. In other words, attributes including the management data from the communication path management table 5 of each communication path is examined according to a predetermined algorithm (discussed in more detail below) to determine which communication path has releasable attributes, if any.

In step S107, the number of communication paths having releasable attributes is compared to 1. If there are more than 1 then execution advances to step S108, otherwise execution progresses to step S119.

If there are a plurality of communication paths having releasable attributes (releasable communication paths), then management data in the communication path establishment time recording area 25 and the communication count recording area 27 of the communication path management table 5 are analyzed in step S108. The communication path having the lowest frequency of use among the plurality of releasable communication paths is retrieved. The manner in which the frequency of use is calculated is as follows: ("communication count"÷ ("communication path establishment time"– "current time")). Other techniques can of course be used.

If there are a plurality of releasable communication paths extracted in step S108, the management data in the last communication time recording area 26 of the communication path management table 5 is examined in step S109 to retrieve the releasable communication path which has not been used for the longest most-recent period of time. Then, this communication path is released in step S110 and checked in step S111 as to whether the communication path has been released successfully. If the result of the step S110 is normal (successful), execution progresses to step S112. If the result indicates a fault (unsuccessful), then execution proceeds to step S119.

Once an available communication path is obtained, management data relating to the communication path released in step S110 is deleted from the communication path management table 5 in step S112. The communication path leading to the peripheral device specified by the requesting task program device is established using the vacant communication path in step S113, and it is checked in step S114 whether the new communication path has been successfully established. Execution then proceeds to step S117 if the communication path is successfully established; otherwise (i.e., if a fault occurred) execution advances to step S119.

Next, management data relating to the communication path established in step S113 is stored in the communication path management table 5 in step S117. Data is then transmitted in step S118 to the peripheral device via the established communication path.

In step S119, one of (1) the result of the data transmission in step S118, or (2) a message that a releasable communication path did not exist in step S107, or (3) a message that the communication path was not released successfully in step S111, or (4) a notice that the communication path was not established in step S114 is output to the requesting task program. Finally, processing is terminated in step S120.

If the examination of the established communication path is normal in step S115, execution proceeds to step S116, where the communication path management table 5 is updated by storing the current time in the last communication time recording area 26 and incrementing by one the communication count recording area 27. Flow then proceeds to step S118, where data transmission takes place. If the result is not normal in step S115, then execution proceeds to step S113, where another communication path is established.

Figure 4:
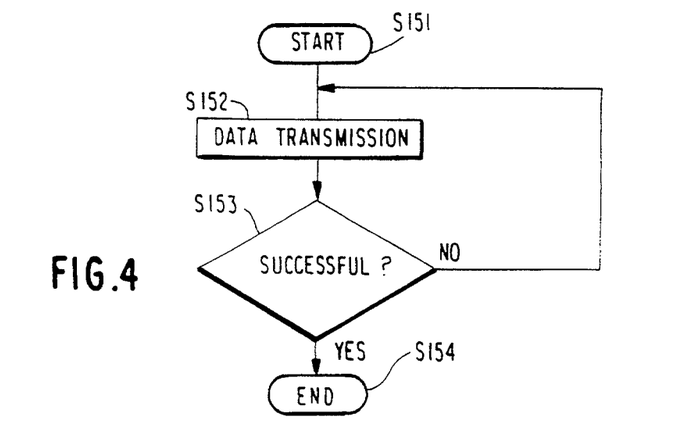
FIG. 4 is a flow chart illustrating a data transmission sequence by a task program device in the data transmission apparatus of FIG. 1.

An example of a data transmission sequence to a peripheral device by one of the task program devices will now be described with reference to the flow chart in FIG. 4.

In step S151, one of the task program devices 3a, 3b starts execution of the task program and outputs a data transmission request to the communication path management device 4, specifying a peripheral device, in step S152. The requesting task program device 3a, 3b then waits for the data transmission end notice from the communication path management device 4. Upon receiving the data transmission end notice from the communication path management device 4, the requesting task program device checks the contents of the data transmission end notice in step S153. If data transmission is successful, the execution advances to step S154, where the processing is terminated. If it has failed, execution returns to step S152 to repeat the above steps.

Figure 5A:
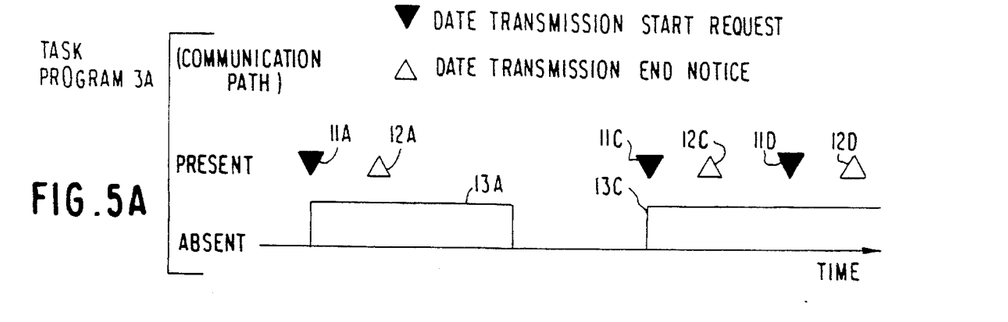
FIGS. 5A and 5B illustrate a timing chart showing how the communication path management device automatically establishes/releases a communication path in response to a data transmission request from the task program device in the data transmission apparatus of FIG. 1.
Figure 5B:
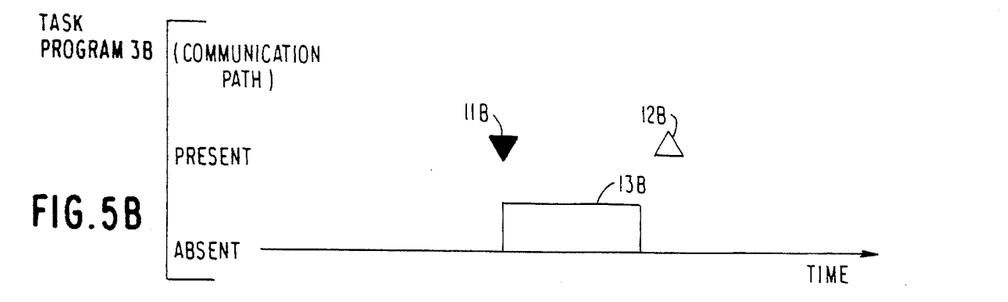

A second example is provided with reference to the timing charts of FIGS. 5A and 5B illustrates how the task program devices 3a and 3b share a single communication path and transmit data.

In this example, the task program device 3a issues a data transmission request 11a and then transmits data. The task program device then waits for a data transmission end notice 12a, which signifies the end of the data transmission operation. This data transmission sequence is identical to the sequence described with reference to the flow chart of FIG. 4.

Unlike the conventional arrangement of FIG. 8, there is in general no need for the task which is using the path to release the path when the current transmission is complete, just as there is no need to request a path in the first instance. Instead, control of the path is relegated to the management device 6, which will release the path to another task when it becomes necessary to do so, in accordance with the rules described above. Thus, as shown in the right half of FIG. 5A, if the path is not released, the current task program holding the path may make repeated communications without being concerned about regaining or checking for path continuity each time.

As described above, when data is to be transmitted, the task program device 3a, 3b need only output the data transmission request to the communication path management device 4 and wait for the result. That is, the task program device 3a, 3b does not have to consider the state of any communication path. For example, if the communication path is abnormally released due to the influence of noise, for example, the communication path is automatically re-established by the communication path management device 4 when the task program device 3a, 3b outputs the data transmission request.

As a result, the operating sequence and the task programs designed for the task program devices 3a, 3b in the embodiment described above are much easier and simpler than that in the conventional art illustrated in FIG. 7.

Moreover, it is not necessary to consider the communication path which allows the task program to transfer data to a peripheral.

Referring back to FIG. 3, the following operations are executed in the sequence below to select and establish a communication path, if a vacant communication path does not currently exist. The sequence of operations include: (1) retrieval of a communication path having releasable attributes (step S106); (2) retrieval of the communication path with the lowest frequency of use (step S108); and (3) retrieval of the communication path which has not been used for the longest most-recent period of time (step S109).

These operations are executed in succession to determine which of a plurality of releasable communication paths should be chosen. The latter operations are used to decide which of plural paths of identical level detected in the retrieval operation in the preceding steps (steps S105 and S106) should be released.

A second embodiment of the present invention will now be described.

Figure 3:
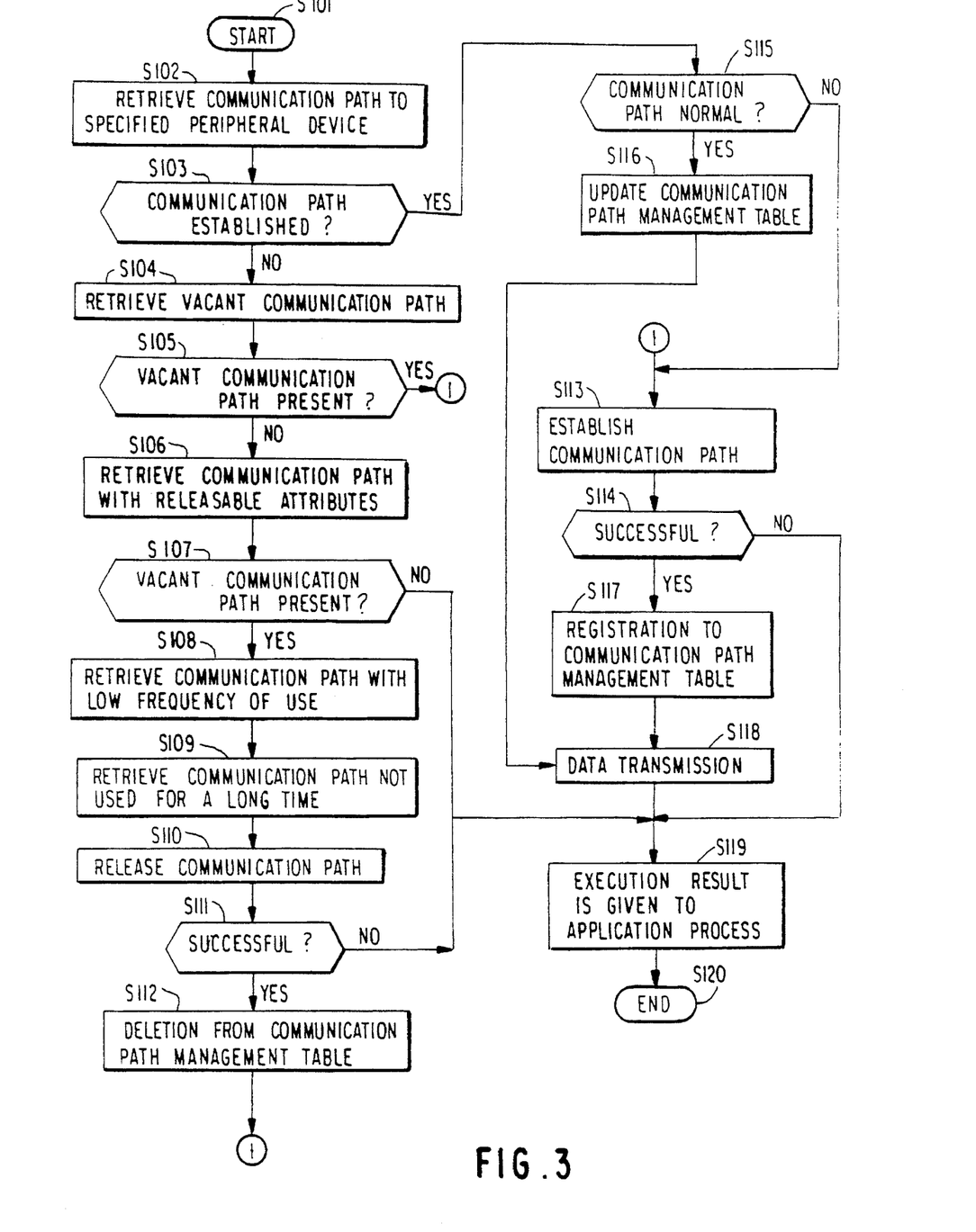
FIG. 3 is a flow chart illustrating the operation of a communication path management device in the data transmission apparatus of FIG. 1.

At step S113 in the flow chart of FIG. 3, a communication path is established with a peripheral device requested by one of the task programs 3a, 3b. At step S114, a determination is made whether the communication path has been established without fault. If it has, in this embodiment, step S117 is skipped and execution continues on to step S118, where data is transmitted to the specified peripheral device through the established communication path. Next, it is checked whether data transmission to the peripheral device has been successful. If successful, in this embodiment the above established communication path is immediately released without updating the communication path management table 5 and the execution advances to step S119. At step S119, the result of the data transmission in step S118 is output to the task programs 3a, 3b. Processing is then terminated at step S120.

In this second embodiment, the communication path management table 5 is not updated and therefore it will not contain management data relating to communication paths whose frequency of use is extremely low. The judgment on low frequency of use can be made by path attributes which indicate that they are not frequently used and that, because of this, they do not have to be registered in the communication path management table 5. It will be noted that, in this embodiment, the path management table continues to indicate that a previous task has "rights" to a particular path, such that this path is effectively "defaulted" to the use of that task.

While task programs are processed in the data transmission apparatus by the task program devices 3a, 3b, it will be appreciated that the task program processing device and the communication path processing device from the communication path management device onward may be separated, mounted in different apparatus, and connected by a communication line such as a serial line (e.g., RS-232C).

There has thus been shown and described a novel data transmission apparatus and a communication path management method therefor which fulfills all the objects and advantages sought therefor. Many changes, modifications, variations, and other uses and applications of the subject invention will, however, become apparent to those skilled in the art after considering the specification and the accompanying drawings which disclose preferred embodiments thereof. All such changes, modifications, variations, and other uses and applications which do not depart from the spirit and scope of the invention are deemed to be covered by the invention which is limited only by the claims which follow.

What is claimed is:

1. A data transmission apparatus for transmitting data from task program devices to peripheral devices over a plurality of communication paths, the data transition apparatus comprising:

a communication path management table for storing management data corresponding to each communication path established between said task program devices and said peripheral devices;

a communication path management device for retrieving said management data from said communication path management table to select a communication path in response to a request from a requesting task program device to establish a communication path to a specified peripheral device; and a communication protocol processor, responsive to an output of said communication path management device, for controlling communications between said task program devices and peripheral devices by establishing said selected communication path between said requesting task program device and said specified peripheral device.

2. The data transmission apparatus as defined in claim 1, wherein said communication path management table comprises means for storing management data comprising a communication path number, a task program label, a peripheral device label, at least one communication path attribute, a communication path establishment time, a last communication time, and a communication count, said management data being stored for each of said plurality of communication paths.

3. The data transmission apparatus as defined in claim 1, wherein said communication path management table comprises means for storing management data relating to a frequency of use of each communication path and a time when each communication path was last used.

4. The data transmission apparatus as defined in claim 1, wherein said communication path management device comprises: means for determining, if a communication path is not already established between the requesting task program device and the specified peripheral device, whether a communication path is vacant; and means for determining, if a communication path is not vacant, a communication path having releasable attributes, wherein said communication path management device selects said vacant communication path, if available, and a communication path having releasable attributes, if no communications path is vacant.

5. The data transmission apparatus as defined in claim 1, wherein the plurality of communications paths are a local area network (LAN).

6. The data transmission apparatus as defined in claim 1, wherein the communication protocol processor controls communication according to a Manufacturing Automation Protocol (MAP) system.

7. The data transmission apparatus as defined in claim 1, wherein the task program devices implement only up to a third Open Systems Interconnection (OSI) layer.

8. A communication path management method for a data transmission apparatus for transmitting data from task program devices to peripheral devices over a plurality of communication paths, comprising the steps of:

retrieving management data stored in a communication path management table and determining based on said management data whether a communication path to a specified peripheral device is already established, by means other than the task program devices;

selecting a communication path to said specified peripheral device if a communication path is not already established, by means other than the task program device; and establishing the selected communication path to said specified peripheral device if a communication path to said specified peripheral device is not already established, by means other than the task program devices.

9. The communication path management method as defined in claim 8, further comprising the step of updating said communication path management table with management data corresponding to said established communication path used to transfer data to said specified peripheral device.

10. The communication path management method as defined in claim 8, wherein said step of selecting a communication path comprises the steps of:

determining whether a communication path is vacant and, if so, selecting said vacant communication path;

selecting, if a communication path is not vacant, a communication path having releasable attributes; and releasing said selected communication path.

11. The communication path management method as defined in claim 10, wherein said step of selecting a communication path having releasable attributes comprises the steps of:

determining the number of communication paths having releasable attributes; and selecting, if there is more than one communication path having releasable attributes, a communication path which has a lowest frequency of use among the communication paths having releasable attributes.

12. The communication path management method as defined in claim 11, further comprising the step of selecting, if there are plural communication paths having a lowest frequency of use, a communication path which has not been used for a longest most-recent period of time.

13. The communication path management method as defined in claim 10, wherein said step of selecting a communication path having releasable attributes comprises the steps of:

determining the number of communications paths having releasable attributes; and selecting, if there is more than one communication path having releasable attributes, a communication path which has not been used for a longest period of time among the communication paths having releasable attributes, wherein if more than one communication path has not been used for said longest time, then a communication path having the most-recent of said longest period of time is selected.

14. The communication path management method as defined in claim 10, wherein, when a communication path to the selected peripheral device is not already established, establishing a first communication path by causing the release of a first selected communication path and then carrying out communications using said first selected communication path; and, subsequently releasing the first selected communication path without updating the communication path management table as to management data regarding said first communication path.

15. The communication path management method as defined in claim 8, wherein said step of selecting a communication path comprises the steps of:

determining whether a communication path is vacant and, if so, selecting the vacant communication path;

selecting, if a communication path is not vacant, a communication path having releasable attributes;

releasing the selected communication path; and updating said communication path management table with management data corresponding to said selected communication path having releasable attributes.

16. The communication path management method as defined in claim 8, further comprising the step of releasing said established communication path immediately after data is transferred to said specified peripheral device.

17. The data transmission method as defined in claim 8, wherein the communication path is across a local area network (LAN).

18. The data transmission method as defined in claim 8, wherein the step of establishing a communication path establishes the communication path according to a Manufacturing Automation Protocol (MAP) system.

19. The data transmission method as defined in claim 8, wherein the task program devices implement only up to a third Open Systems Interconnection (OSI) layer.

* * * * *